United States Patent [19]
Rychlik

[11] 3,821,941
[45] July 2, 1974

[54] VALVING FOR INTERNAL COMBUSTION ENGINE

[76] Inventor: Frank J. Rychlik, 5200 N. Reserve, Chicago, Ill. 60656

[22] Filed: Jan. 2, 1973

[21] Appl. No.: 320,157

[52] U.S. Cl. ........ 123/65 WA, 123/65 V, 123/30 C
[51] Int. Cl. ...................... F02b 75/02, F02d 39/04
[58] Field of Search ........ 123/65 VB, 65 V, 65 WA, 123/90.11, 73 AB, 74 AA, 188 AP, 188 R, 30 C; 251/65

[56] References Cited
UNITED STATES PATENTS

| | | | |
|---|---|---|---|
| 1,988,018 | 1/1935 | Peterson | 123/188 AP |
| 2,030,732 | 2/1936 | Angel | 123/65 VB |
| 2,256,437 | 9/1941 | Kylen | 123/73 AB |
| 2,599,898 | 6/1952 | Dalrymple | 251/65 |

FOREIGN PATENTS OR APPLICATIONS

| | | | |
|---|---|---|---|
| 625,667 | 7/1949 | Great Britain | 251/65 |
| 369,755 | 3/1932 | Great Britain | 123/65 VB |
| 20,958 | 10/1905 | Great Britain | 123/65 VB |

*Primary Examiner*—Carlton R. Croyle
*Assistant Examiner*—Louis J. Casaregola
*Attorney, Agent, or Firm*—Ray E. Snyder

[57] ABSTRACT

A modified stratified charge engine, having a unique pressure actuated inlet valve arrangement for controlling the induction of fuel and air into the combustion cylinder as a rapidly swirling mass, thereby to produce efficient combustion and, correspondingly, low exhaust emissions. An engine of the type described capable of operating with substantially equal efficiency, and without knock, on a wide range of octane rated fuels.

6 Claims, 4 Drawing Figures

PATENTED JUL 2 1974 3,821,941
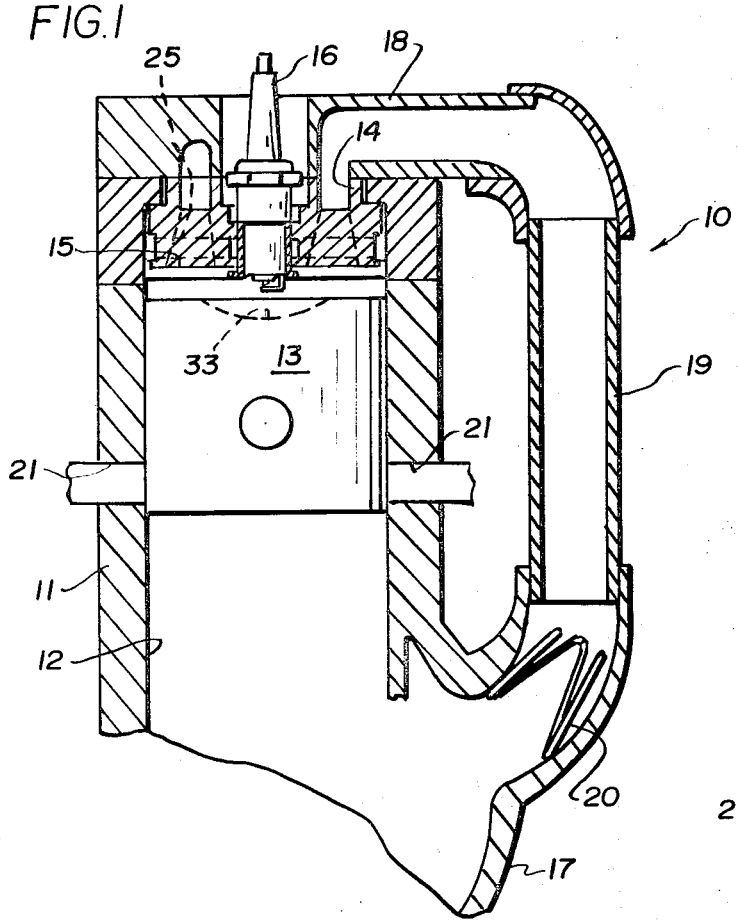
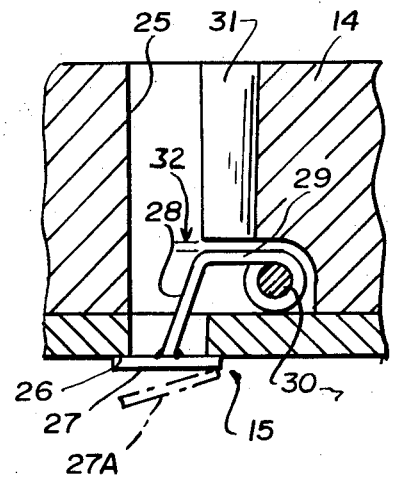
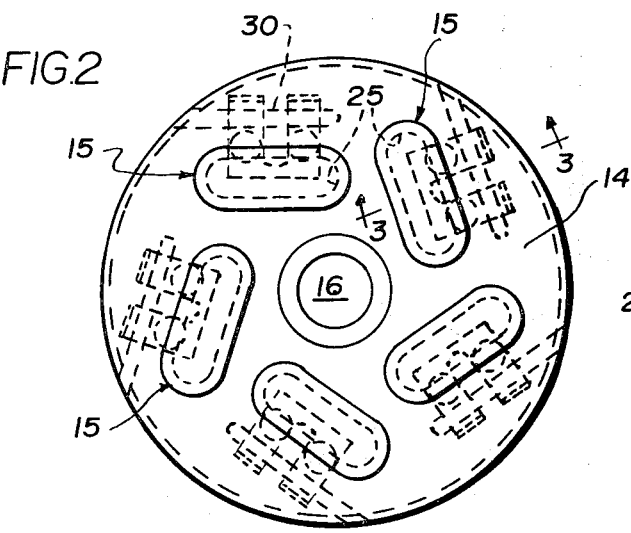
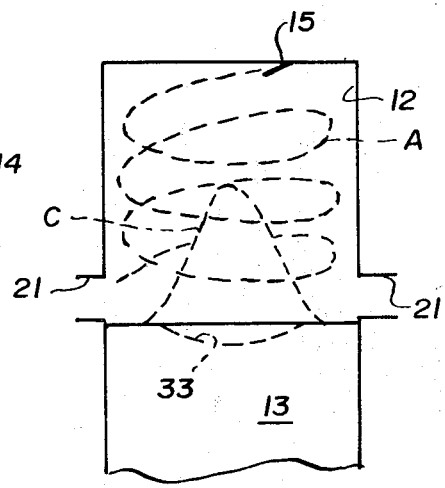

VALVING FOR INTERNAL COMBUSTION ENGINE

BACKGROUND OF THE INVENTION

1. Field of the Invention

This invention relates to two-cycle internal combustion engines of the type wherein the exhaust gases are scavenged by incoming fuel-air mixture. More particularly, the invention relates to a multiple-inlet valve design for inducting air into the combustion cylinder, either as a fuel-air mixture, or as air separately in conjunction with injected fuel.

2. Description of the Prior Art

Two-stroke-cycle engines are well known in the art and are notorious for their emission of unburned hydrocarbons and other noxious by-products of the internal combustion engine process. In most engines of this type, in order to scavenge the burned gases at the end of the power stroke, and during the time both the intake and exhaust ports are open, the fresh fuel-air mixture mingles with the burned gases and is carried out the exhaust port. In addition, the incoming fuel-air mixture is required to burn in the presence of a substantial portion of residual gases from the preceeding power stroke. This tends to reduce the efficiency of the combustion process and further increases the output of undesirable emissions.

SUMMARY OF THE INVENTION

It is an object of the invention to provide a unique valve arrangement in the cylinder head of a two-cycle engine for inducting a fuel-air mixture into the cylinder in a swirl pattern. The induction of air in this fashion compresses the exhaust gases downwardly from the top of the engine cylinder and out the exhaust port or ports. This manner of air induction results in the "trapping" of a larger portion of the incoming fuel-air mixture and less loss through the exhaust port.

It is a more particular object to provide an inlet valve arrangement having the inlet valves disposed in a radial array surrounding the spark plug in the center of the cylinder head.

It is still another object to provide valves of the type described that are pressure-actuated to open and close and are magnetically biased toward a closed position.

It is still another object to provide a means of induction of a fuel-air mixture into a combustion cylinder whereby a residual "cone" of burning gases, or hot burned gases, is retained in the cylinder to provide self-ignition, (or eliminate spark ignition), during the next power stroke.

BRIEF DESCRIPTION OF THE DRAWINGS

FIG. 1 is a longitudinal sectional view of an engine cylinder of the present invention;

FIG. 2 is an enlarged phantom bottom view of the interior surface of the cylinder head;

FIG. 3 is an enlarged fragmentary sectional side view of an inlet valve mounted in the cylinder head, and taken on line 3—3 of FIG. 2; and FIG. 4 is a schematic diagram of the fluid dynamics of the combustion process.

DETAILED DESCRIPTION OF THE DRAWINGS

The portion of the improved two-cycle engine shown in FIG. 1 is designated generally by the numeral 10 and comprises: a housing 11 formed with a cylinder bore 12, a piston 13 disposed to reciprocate within the bore 12, a cylinder head 14 containing a plurality of inlet valves 15, a spark plug 16 mounted in the center of the cylinder head 14, and a crankcase housing 17. An air intake manifold 18 is mounted on top of the cylinder head 14 and is connected to the crankcase housing 17 through an external conduit 19. Leaf valves 20 are disposed in the conduit 19 permitting one-way flow of a fuel-air mixture from the crankcase interior to the air intake valves 15. Exhaust ports 21 are formed through the sides of the cylinder wall 11.

Referring to FIGS. 2 & 3, the air inlet valves 15 are illustrated in greater detail. It can be seen in FIG. 2 that the sprak plug 16 is mounted in the center of the cylinder head 14, and the inlet valves 15 are mounted in a radial pattern around the central spark plug 16. A plurality of ports 25, one for each valve 15, are formed through the cylinder head 14. The ports 25 are open at their upper ends to the interior of the air intake manifold 18, and are adapted to be sealed at their lower ends by the valves 15. The cylinder head surface surrounding the lower end of the port 25 defines a valve seat 26 for the valve 15.

Each of the valves 15 comprises a flat, oval shaped flap 27 with an upper surface adapted to seal against the valve seat 26 and a pivotable mounting arm 28 located within a recess formed in the air inlet port 25 and rigidly attached to the flap 27. The arm 28 is made of magnetically attractable material and is formed with a horizontal shank portion 29. The arm 28 is mounted to pivot in a vertical plane about a horizontal pin 30 mounted in the cylinder head 14. An adjustable magnet 31 (or magnets) is mounted in the cylinder head 14, immediately above the shank portion 29 of the arm 28. The magnet 31 does not touch the shank 29, but is adjustable up or down leaving an air gap 32. The magnet 31 is adjusted to provide some calibrated bias force on the arm 28 so that the valve 15 will open for some predetermined desired pressure differential across the flap 27. Once the valve 15 starts to open, the gap 32 widens, and the magnetic force of attraction on the arm 28 decreases. This permits the valve flap 27 to move quickly into the maximum open position 27A. Air entering the port 25 from the manifold 18 is deflected by the flap 27 and is directed tangentially inward into the cylinder 12. The effect of the air entering through all of the valves 15 is to set up a rapidly swirling flow within the cylinder 12. When the pressure differential across the valve flap 27 reverses, the magnet 31 provides the initial bias force to start the valve 15 to close. Once the closing motion is started, the pressure differential rapidly causes complete closure.

It should be noted that in this application, the use of magnets 31 to provide the closing bias force is preferable to the use of springs. It is desirable for the valve 15 to open quickly to a full open position 27A to permit maximum entry of air; and the force of attraction of the magnet 31 on the arm 28 decreases with increased opening of the air gap 32. The force exerted by a spring increases with displacement and thus would inhibit complete opening of the valve 15.

The operation of the engine 10, relevant to the present invention, may be described as follows:

At the beginning of a power stroke, the piston 13 may be in the position shown in FIG. 1. The spark plug 16 ignites the compressed mixture of fuel and air within the cylinder 12 and the expanding gas forces the piston 13 downward. The descending piston 13 compresses the fuel-air mixture within the crankcase 17 forcing some of this mixture through the leaf valves 20, through the tube 19, and into the air intake manifold 18. At the point during the downstroke when the top of the piston 13 passes the exhaust port 21, the pressure within the cylinder 12 drops sharply and the pressure within the air intake manifold 18 exceeds the pressure within the cylinder 12 and causes the valves 15 to open. The fuel-air mixture enters through the valves 15 and sets up a swirling motion near the top of the cylinder 12. As the incoming air continues to enter the cylinder 12, it follows a spiral or helical path downward, compressing the burnt gases out through the exhaust ports 21. This pattern is designated by "A" in FIG. 4.

This mode of operation provides for efficient expulsion of exhaust gases. The incoming fuel-air mixture is colder and more dense than the burned gases, and must follow a longer, helical path to reach the exhaust ports 21. This mode also results in the "trapping" of a greater portion of the incoming air in the cylinder 12 after the piston 13 rises to close the exhaust ports 21, than is the case in the conventional two-cycle engine. (It is not desirable to expel all of the exhaust gases for a reason to be described hereinafter.)

As the piston 13 continues to rise, and after the exhaust ports 21 are closed, the swirling mixture of fuel and air is compressed within the cylinder 12. The rising piston 13 also reduces the pressure within the crankcase 17 and at some point in time, the pressure within the cylinder 12 exceeds the pressure within the manifold 18 and the valves 15 snap shut. When the piston 13 reaches the top of the cylinder 12, it is ready for the next power stroke.

The operation of this engine design has produced an additional new phenomenon, not heretofore observed to the inventor's knowledge. Because of the greater density and inertia of the swirling incoming fuel-air mixture, this incoming air tends to occupy the space nearest to the top and along the cylinder walls, and traps a cone of hot exhaust gas immediately above the piston 13. The piston 13 may be dished out, or formed with a spherical depression 33 to help contain this cone of burnt gases, designated as "C" in FIG. 4. It has been observed that the compression of this cone of hot gases along with the heat of compression of the new fuel-air mixture can cause self-ignition of the mixture. The measured performance of the engine under these conditions has provided some remarkable results as will now be described.

A standard production 2-cycle engine, designed for outboard use, was modified in accordance with the principles of the present invention and compared with its unmodified commercial counterpart.

MODIFIED ENGINE EMISSIONS

| RPM | Spark Advance | Hydrocarbons PPM N-Hexane | Co % | No. PPM | Trapping Efficiency % |
|---|---|---|---|---|---|
| 4000 | +15 | 3,050 | 4.4 | 235 | 87.0 |
| 4000 | +25 | 2,983 | 4.1 | 345 | 86.5 |
| 4000 | 0 | 2,967 | 3.9 | 300 | 86.2 |
| 3500 | +15 | 2,967 | 4.6 | 125 | 86.4 |
| 3000 | +7 | 3,217 | 2.4 | 135 | 84.7 |

PRODUCTION ENGINE EMISSIONS

| 4000 | +32 | 7,500 | 5.0 | — | 72.0 |
| 3000 | +32 | 10,000 | 5.0 | — | 73.0 |

MODIFIED ENGINE HORSEPOWER

| RPM | CBHP | Fuel Flow | Condition |
|---|---|---|---|
| 4000 | 25.2 | 2.34 | Self-ingition |
| 4000 | 19.4 | 2.95 | Spark |
| 3000 | 9.7 | 2.51 | Spark |

The first comparison to be noted is that at 4,000 rpm, the unburned hydrocarbon emission is nearly 60 percent lower than for the production engine, and the trapping efficiency is at least 14 percent greater. At 3,000 rpm, the hydrocarbon emission is lower by more than 67 percent. The carbon monoxide emission is slightly lower than the production engine at 4,000 rpm and lower by more than 50 percent at 3,000 rpm. The effectiveness of this engine design in reducing undesirable emissions thus is clearly demonstrated.

The most interesting observation to be made, however, has to do with the corrected brake horsepower measurement under the "self-ignition" condition, as compared to spark ignition. For the same engine speed of 4,000 rpm, the horsepower is nearly 30 percent greater under "self-ingition" than for spark ignition, and the fuel consumption is nearly 20 percent less. Compared with the spark ignition condition at 3,000 rpm, the horsepower of the self-ignition condition at 4,000 rpm is 160 percent greater, and the fuel consumption rate is lower at 4,000 rpm than at 3,000 rpm.

Some general observations regarding the operation of the modified engine under test conditions are also remarkable. It was discovered that at speeds above 2,500 rpm, the engine could be operated in compression or preignition, since the spark plug wires could be removed with no change in engine operation. However, spark ignition was necessary for starting. Combustion pressure traces revealed a smooth looking pressure history without indication of detonation.

Subsequent tests have shown that the engine could be idled in the "self-ignition" condition as well as at higher speeds.

The modified engine ran the same on 65 octane T.V.O. 91 octane gasoline, and 120–130 octane aviation fuel. Inspection of the engine immediately after test showed no hot spots that might cause a glow-plug type of ignition.

It is the inventor's premise that the improved performance is caused by better chemical combination of fuel and air due to the more thorough mixing in the swirling process. Self-ignition of the mixture is initiated and aided by the heat provided from the "cone" of residual gases together with the heat of compression due to energy supplied to the mixture by the piston during the compression stroke.

This premise is supported by the fact that the engine ran the same regardless of the octane of the fuel used. In the tests tabulated above, the engine was operated on a dynamometer with open exhaust. With sprak controlled ignition, blue flame appeared constantly at the exhaust ports. In self-ignition operation, there was very little visible flame at the ports; however, a red flame was always evident at the top edge of the upper exhaust ports in each cylinder.

This engine design offers several additional advantages over conventional 2-cycle engines. The engine idles better without fouling of the spark plug because of the mode of fuel-air induction, and the use of lower fuel/air ratios. No solid-state or capacitive discharge types of ignition are required. Longer spark plug life is possible because spark ignition can be eliminated for sustained operation, except for starting.

While the embodiment of the invention shown and described inducts a mixture of fuel and air into the combustion cylinder, it is contemplated that the same principles might be applied wherein only air is introduced in this manner and fuel is injected into the cylinder. If fuel is injected on the compression stroke of the piston, and after the piston has closed the exhaust port, this by definition results in 100 percent entrapment of fuel.

In addition, while crankcase compression is utilized to pressurize the air intake manifold, it is contemplated that other means of pressurizing the manifold, by blowers and the like, might be employed without departing from the principles of the invention.

It is to be understood further that the embodiment of the invention shown and described is by way of example only, and the invention is not to be considered as limited thereto, except insofar as the claims may be so limited.

I claim:

1. In an internal combustion engine having a housing formed with a fuel combustion cylinder, a reciprocating piston within the cylinder, a cylinder head capping the upper end of the cylinder, and an exhaust port formed through the cylinder wall at a point remote from the cylinder head, the improvement comprising:

a plurality of air inlet ports formed through said cylinder head;
an air intake manifold mounted on said cylinder head for inducting air into said ports; and
a plurality of pressure actuated flap valves mounted on the interior of said cylinder head and adapted to move arcuately into the cylinder to open said ports and adapted to seal against the interior of the cylinder head to close said ports, said valves when fully opened being disposed so as to direct substantially all of the incoming air into said cylinder tangentially in a circular swirl pattern.

2. The engine of claim 1 including:
adjustable magnetic bias means mounted in said cylinder head and effective to act on and to bias said pressure actuated valves toward a closed position and also effective to calibrate said valves to open for some predetermined pressure differential across said flap valves.

3. The engine of claim 1 including:
means for retaining a cone of hot residual exhaust gases within said cylinder for mixing with the swirling mass of incoming fuel-air mixture to provide self-ignition of the mixture during the next succeeding power stroke of said piston.

4. A method for controlling the combustion process within a two-stroke-cycle internal combustion engine having a housing formed with an internal cylindrical bore defining a combustion cylinder, a reciprocating piston disposed within the cylinder, a cylinder head defining an end wall for the combustion cylinder, a plurality of air inlet ports formed through the cylinder head, a plurality of pressure actuated air inlet flap valves mounted on the interior of the cylinder head and adapted to move arcuately into the cylinder to open the air inlet parts and adapted to seal against the interior of the cylinder head to close the air inlet ports, an air intake manifold connected to the cylinder head for providing air under pressure to the inlet ports, and an exhaust port formed through the cylinder wall at a pont remote from the cylinder head, the steps comprising:

providing a fuel-air mixture to the air intake manifold;
pressurizing the air intake manifold to cause induction of said mixture through said air inlet ports and said air inlet valves;
deflecting said mixture with the air inlet valves into said cylinder as a rapidly swirling mass;
using said inducted fuel-air mixture to expel exhaust gases through the exhaust port;
entrapping a residual cone of hot exhaust gases above said piston; and
mixing said entrapped exhaust gases with said fuel-air mixture during the compression stroke of said piston to cause self-ignition of said mixture for the next power stroke of said piston.

5. An air intake valving system for a two-stroke-cycle engine having a housing with a combustion cylinder, a piston reciprocably disposed within the cylinder, a cylinder head, and an exhaust valve formed through the cylinder wall and adapted to be opened and closed by the reciprocating piston, the improvement comprising:

a plurality of air inlet ports formed through said cylinder head and disposed in a circular array;
a pressure actuated flap valve for each of said ports mounted on said head and adapted to move arcuately into the cylinder to open said ports and to deflect incoming air into the cylinder in a circular pattern during the time the exhaust port is opened by the piston; and means for entrapping a central cone of hot exhaust gases from a preceeding power stroke for mixing with the incoming air to cause selfignition of the next successive power stroke.

6. The valving system of claim 5 including:
fuel injection means for injecting fuel into the cylinder during the compression stroke of the piston and after the exhaust port has been closed by the piston.

* * * * *